May 22, 1962  R. NEUSCHOTZ  3,035,797
DETACHABLE CONNECTOR ASSEMBLY FOR FUEL CELLS
Filed Jan. 26, 1959  2 Sheets-Sheet 1
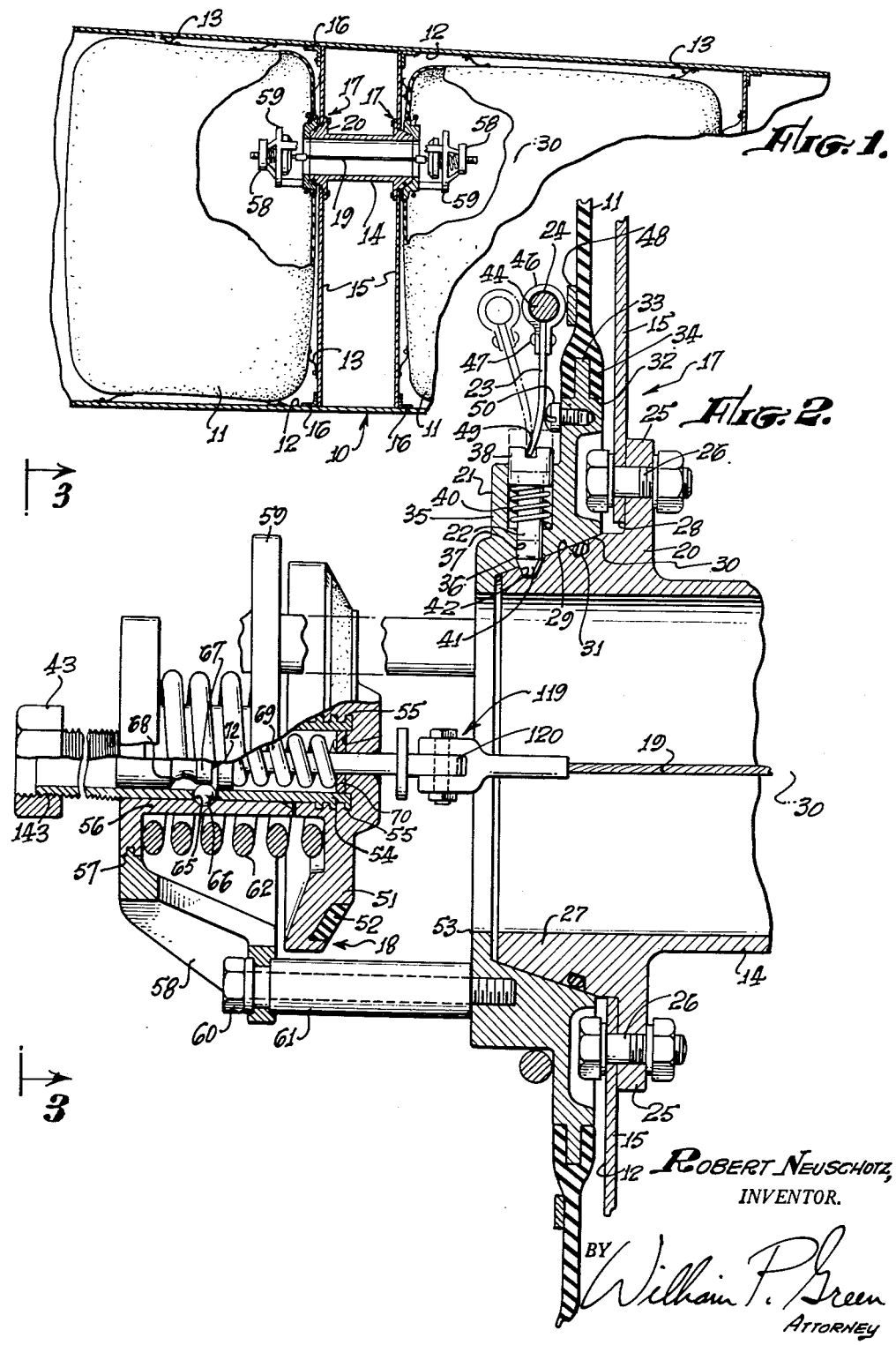
Robert Neuschotz,
INVENTOR.
BY William P. Green
ATTORNEY May 22, 1962 R. NEUSCHOTZ 3,035,797
DETACHABLE CONNECTOR ASSEMBLY FOR FUEL CELLS
Filed Jan. 26, 1959 2 Sheets-Sheet 2
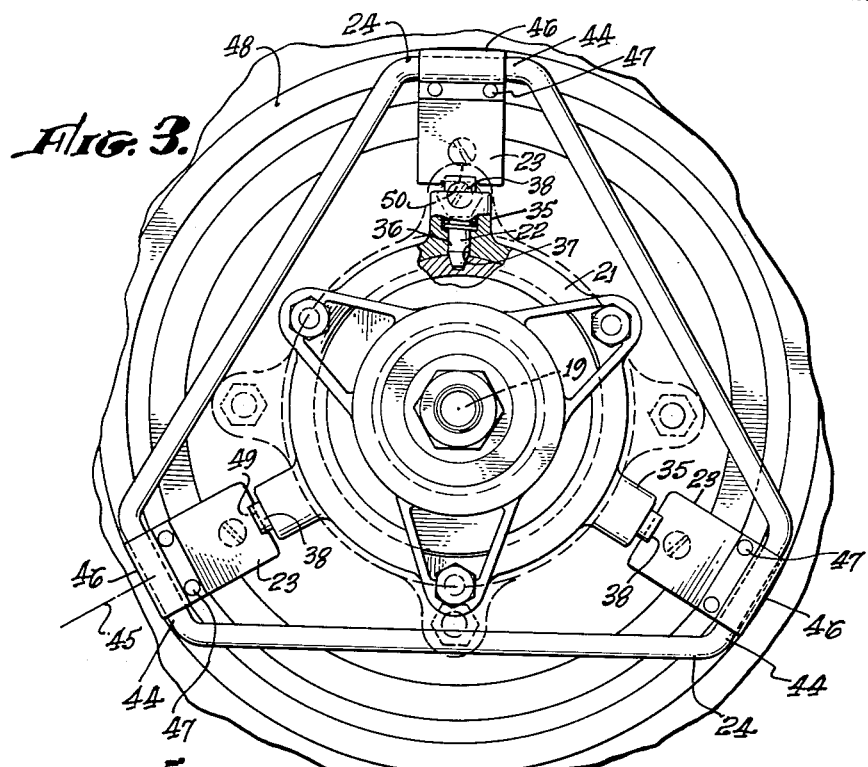
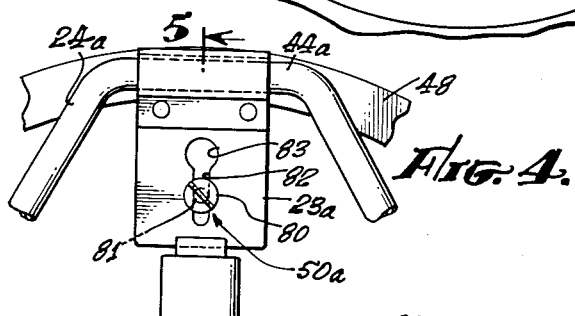
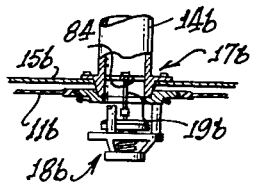
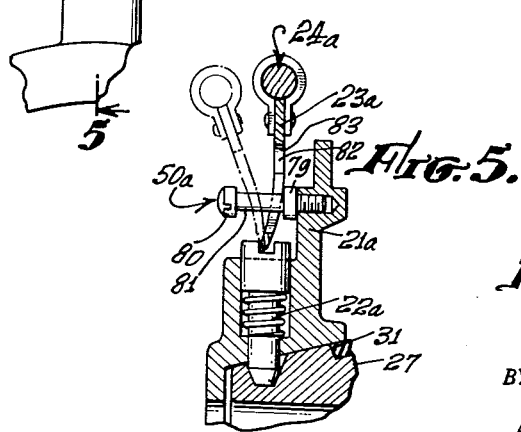
ROBERT NEUSCHOTZ,
INVENTOR.
BY William P. Green
ATTORNEY United States Patent Office 3,035,797
Patented May 22, 1962

3,035,797
DETACHABLE CONNECTOR ASSEMBLY FOR
FUEL CELLS
Robert Neuschotz, 1162 Angelo Drive,
Beverly Hills, Calif.
Filed Jan. 26, 1959, Ser. No. 788,856
14 Claims. (Cl. 244—135)

This invention relates to apparatus for use with a fuel cell or other fluid containing cell of an aircraft, and is particularly concerned with certain improved fluid conducting fittings for detachably connecting such a cell to an adjacent portion of an aircraft.

In the past, one of the greatest dangers encountered in the crash of an aircraft has been the danger of fire, produced by burning of the fuel as the fuel cells are ruptured. To prevent such fires, there has now been developed a special crash resistant type of fuel cell, formed of reinforced rubber or plastic, which is capable of maintaining its integrity as a unitary closed cell under crash forces of very high magnitude, and even though the cell as a unit may be bodily torn from its normal position in the craft. The fuel is thus effectively confined within the cell in isolation from the atmosphere, in a manner minimizing the danger of fire at the crash scene.

The general object of the present invention is to provide an improved type of fluid conduit assembly which is to be used for placing a cell of the above discussed type in communication with another portion of an aircraft but which is especially designed to allow complete detachment of the cell from that other portion of the craft at the time of a crash. Several such assemblies may be connected into a single cell, to place the cell in communication with various different pieces of equipment on the aircraft, such as another fuel cell, an engine, a vent line, or any other desired part of the craft. Each of these assemblies is preferably employed in conjunction with an automatic shut-off valve, such as that shown in my co-pending application Serial Number 789,013 filed January 26, 1959 on "Automatic Shut-off Valve," which valve functions to automatically close off communication through the assembly with the interior of the cell if the cell is torn from its normal position by a crash.

Structurally, a conduit assembly embodying the invention includes two separately formed sections, one of which is attached to the fuel cell and the other of which is connected to an adjacent portion of the aircraft. These two sections are normally held together in assembled fluid conducting relation by releasable latch means, which may be adapted for automatic release in the event of a crash, to thereby free the cell from its attachment to the rest of the craft. Preferably, the latch means are designed to be automatically released by crash induced deflection of the flexible wall of the fuel cell itself. As will appear, the assembly desirably includes several individual latch elements spaced about the conduit assembly, and retained in holding positions by individual leaf spring parts, which parts are so interconnected by a carrier member as to all be released in response to deflection of the cell wall at a location adjacent any of the latch parts.

The above and other features and objects of the present invention will be better understood from the following detailed description of the typical embodiments illustrated in the accompanying drawings, in which:

FIG. 1 is a fragmentary representation of the interior of an aircraft wing which contains fuel cells provided with fittings constructed in accordance with the present invention;

FIG. 2 is an enlarged fragmentary section through a portion of the apparatus shown in FIG. 1;

FIG. 3 is an end view taken on line 3—3 of FIG. 2;

FIG. 4 is a fragmentary end view similar to FIG. 3 but showing a variational form of the invention;

FIG. 5 is a section taken on line 5—5 of FIG. 4; and

FIG. 6 is a fragmentary view showing another variational form of the invention.

Referring first to FIG. 1, I have shown at 10 a portion of the wing of an aircraft, which contains a number of individual fuel cells 11 positioned within separate compartments 12 in the wing. The cells take the form of relatively large fluid tight bladders or bags, adapted to effectively contain the fuel of the aircraft without leakage, with the walls of the cells normally being formed of a flexible fabric reinforced rubber or plastic material. Each of the cells is held in position in the wing (or other portion of the aircraft), and is held in its opened condition, by a series of tabs 13 or other holding elements, typically carried by the cell wall and suitably secured to the framework of wing 10. These tabs or connections 13 are of a type adapted to be relatively easily broken in the event of a crash tending to tear the cells 11 from the adjacent wing structure. In the present disclosure, it is to be assumed that each of the cells 11 is constructed of sufficiently heavy and strong material that, if a crash tears the cell from its normal position in the aircraft, the cell itself will remain intact, and will not rupture at any point, so that the contained fluid is still confined effectively within the cell and is not allowed to spill over the wreckage in a manner introducing danger of fire at the crash scene.

In the FIG. 1 arrangement, the two adjacent cells 11 are represented as being placed in intercommunication, for flow of fuel therebetween, by means of a tubular fluid tight interconnector 14, typically extending between a pair of transverse walls or structural elements 15 which may be rigidly attached to the rest of the wing structure, as by angle irons 16. In some instances, however, there may be no such walls or other structural members between the cells. At its opposite ends, the interconnector 14 is secured to cells 11, and to walls 15 if such walls are present, by means of a pair of connecting assemblies represented generally at 17, which assemblies are so constructed in accordance with the present invention as to automatically disconnect either of the cells from the interconnector (and from the wing structure if initially attached thereto) in the event of displacement of that cell relative to the rest of the aircraft by crash forces. In combination with these automatic release connecting assemblies 17 at opposite ends of interconnector 14, there are provided also two automatic shutoff valve assemblies 18, interconnected by an actuating cable 19, and adapted to close off all communication between the interior of one of the cells and its exterior at the location of the associated assembly 17 when the connection at that assembly 17 is broken in the above discussed manner. These automatic shut-off valve assemblies 18 are shown and claimed in my copending application Ser. No. 789,013 filed January 26, 1959 on "Automatic Shut-Off Valve."

Referring now especially to FIG. 2, each of the connecting assemblies 17 includes a first fitting or ring 20 which is rigidly attached to interconnector tube 14 (typically integral therewith, as shown), and each assembly 17 also includes a second ring or fitting 21 permanently attached to the associated cell 11. These two rings 20 and 21 are normally held together in their FIG. 2 assembled relation by means of a series of circularly spaced dogs or latch elements 22, which are retained in their active holding positions by individual leaf springs 23 carried by generally loop shaped carrier member 24. As will appear at a later point, carrier 24 is deflectable from its FIG. 2 full line position to its FIG. 2 broken line position in response to flexure of an adjacent portion of the wall of cell 11, and when then thus deflected, carrier 24 functions to release all of the dogs or latch elements 22 in a manner freeing ring 21 from ring 20.

The ring 20 may be attached to one of the rigid structural walls 15 in any suitable manner, as by means of a series of circularly spaced mounting ears 25, and bolts 26 extending through those ears and through openings in wall 15. Axially beyond these ears 25, each ring 20 has a portion 27 projecting through an opening 28 in wall 15, and presenting an annular typically frustro-conical seal surface 29 centered about the main axis 30 of the assembly, and engageable with a correspondingly shaped annular frustro-conical seat surface 30 on ring 21. An elastomer O-ring 31 may be positioned within an annular groove formed in the central portion of seal surface 29 of ring 20, to annularly engage both of the rings 20 and 21 in a manner forming a positive fluid tight seal between these parts in their assembled FIG. 2 positions.

Ring 21 is connected into a typically annular opening 32 formed in the wall of the associated fuel cell 11. The periphery of ring 21 is attached to the material of cell 11 annularly and in fluid tight sealing relation, as by providing ring 21 with a radially outwardly projecting flange portion 33 extending into a mating recess formed within an enlarged portion 34 of the cell wall, with the material of the cell wall being continuously annularly vulcanized or otherwise bonded to flange 33 and the adjacent portions of ring 21 in a manner preventing any fluid leakage therebetween.

There may typically be three of the latch or dog elements 22, mounted to ring 21 at three evenly circularly spaced locations. Each of these latch elements 22 is mounted within a boss portion 35 of ring 21 in a manner confining the latch element for only radial movement with respect to main axis 30 of the apparatus. Each latch element has a radially extending externally cylindrical shank portion 36 slidably confined within a correspondingly shaped bore 37 formed in ring 21. Also, each latch element has an outer increased diameter externally cylindrical head portion 38 slidably confined within an enlarged diameter bore 39, with a coil spring 40 being received within a radially inner portion of that bore to yieldingly urge the latch element radially outwardly from its full line position of FIG. 2 to its broken line position of that figure. At its inner end, the latch element has an inwardly tapering frustro-conical surface 41, which is receivable within and is shaped in correspondence with a tapering opening 42 formed in ring 20. As will be apparent, when latch elements 22 are in their full line positions of FIG. 2, ring 21 is effectively held against detachment from ring 20.

Where three of the latch or dog elements 22 are employed, the carrier member 20 may take the form of an essentially triangular element, as seen in FIG. 3. Radially outwardly of each of the latch parts 22, carrier 24 has a portion 44, to which the associated leaf spring 23 is mounted, with portion 44 desirably extending directly transversely of the axis 45 of latch part 22. The leaf spring 23 is mounted to portion 44 by means of a metal strap 46, which extends about portion 44 and has its opposite ends riveted at 47 to opposite sides of spring 23. Axially opposite each of these straps 46 and the associated portion of carrier 24, there is mounted to the inner surface of the cell wall an annular metal part 48, to prevent undue wear on the cell wall by engagement with parts 46. In the event of a crash of the aircraft, forces tending to bend the cell wall inwardly relative to ring 21 (to the left as seen in FIG. 2) will cause ring 48 to engage one of the parts 46 and deflect it with the contained portion of carrier 24 from the full line position of FIG. 2 to the broken line position of the figure, to in this way release dog elements 22 for radially outward movement to their broken line released positions.

Each of the leaf springs 23 normally tends by its own resilience to assume a completely flattened condition. However, the inner edge of each spring 23 is confined within a transverse slot or recess 49 formed in the outer surface of head 38 of the latch part, and since the spacing radially between portion 44 of carrier 24 and the head of the latch part when in its full line FIG. 2 position is less than the normal extended radial length of leaf spring 23, that spring must assume a bent position, as seen in FIG. 2. By virtue of this deformation of the three leaf springs 23, each of these springs functions with its associated parts as an over center spring or toggle type arrangement. When one of the springs 23 is in the full line position of FIG. 2, that spring is located to the right of its center position, and thereby functions to yieldingly urge part 46 and the connected portion of carrier 24 to the right, with that rightward movement being limited at a predetermined normal position of the spring by engagement of the spring with the head of a stop screw 50 connected into ring 21. When the cell wall 11 and carried ring 48 deflect spring 23 and parts 24 and 46 to the left, upon flexure of cell 11, these parts 23, 24 and 46 ultimately reach and pass a center position, beyond which the resilient force of spring 23 tends to urge these parts further to the left, rather than to the right. The broken line position of FIG. 2 is located to the left of that center position. The parts are so proportioned that, when one of the springs 23 is deflected to the left beyond its center position, that spring immediately moves to the left to a completely released position (say the broken line position of FIG. 2) in which the deflected spring 23 is no longer capable of exerting sufficient radially inward force to hold the associated latch part 22, or any of the other latch parts, in their active positions. Consequently, this deflection of one of the springs 23 acts to completely release ring 21 from its attachment to interconnector 14, and to the frame portions 15 of the aircraft. If desired, it is contemplated that the parts 23 may be made rigid rather than resilient, in which case the yielding holding action can be attained by designing part 24 to have some resilient flexibility.

Turning now to the construction of the automatic shutoff valve assemblies 18, each of these assemblies includes an annular valve element 51, which is movable axially along the previously mentioned main axis 30 of the apparatus, between the open position of FIG. 2 and a closed position in which deformable seal washer 52 carried by element 51 annularly engages a seat surface 53 formed at the inner end of ring 21. To mount the valve for this axial movement, part 51 is rigidly attached to a tubular stem member 54, whose inner end may be grooved at 55 and cast into part 51, to secure these parts rigidly together. Tubular stem 54 is mounted within a tubular sleeve 56 for only axial movement relative thereto, with sleeve 56 being rigidly secured at 57 to a bonnet or spider structure 58, whose mounting ring portion 59 is rigidly attached by a plurality of circularly spaced bolts 60 to ring 21. About each of the bolts 60 there is provided a spacer sleeve 61, axially between ring 21 and ring 59, to maintain the latter in the illustrated spaced relation with respect to ring 21.

Valve 51 is continuously yieldingly urged toward its closed position (to the right in FIG. 2) by a rather heavy and strong coil spring 62, which is interposed axially between and engages opposed shoulders on parts 51 and 56 respectively. Such closing actuation of valve 51 is normally prevented, however, by a latching or holding mechanism including several ball detents 63 coacting with parts 54 and 56, and with a spring pressed plunger part 64 contained within element 54. There may typically be four of the balls 63, mounted within a series of circularly spaced apertures 65 formed in part 54, and free for limited radial movement within those apertures. In the FIG. 2 holding position of balls 63, the radially outer portion of each ball is received within an annular groove 66 formed in the inner surface of part 56, with this engagement serving to effectively latch part 54 and the carried valve elements 51 and 52 against rightward movement under the influence of spring 62. To hold each of the balls in this outwardly projected latching position, plunger 64 has an annular surface 67 which engages the balls in the FIG. 2 position, and prevents them from moving radially inwardly out of the latch groove 66. The balls can be released for radially inward movement, toward axis 30, by shifting plunger 64 to the right sufficiently to allow the balls to fall into an annular groove 68 formed in the plunger adjacent surface 67. The plunger is yieldingly urged to the left in FIG. 2, and to its illustrated latching position, by means of a coil spring 69 contained within part 54 and bearing at its opposite ends against plunger 64 and a ring 70 which is seated against a shoulder 71 formed by part 51. This leftward movement of plunger 64 is limited by engagement of a small annular shoulder 72 on plunger 64 with the ball detent elements 63.

The plunger 64 is actuated to the right, to its latch releasing position, by means of the previously mentioned flexible cable 19 which extends between the two valve assemblies 18. The line or cable 19 may be a conventional steel cable, formed of several twisted strands of wire, with the cable being attached at 119 to an extension 120 of plunger 64, which extension passes through apertures 73 in parts 51 and 70, and through the interior of coil spring 69.

When valve 51 is in its closed position, the ball detent elements 63 are moved entirely out of tubular element 56. In order to then retain these balls against loss from apertures 65, the material of part 54 is purposely staked or upset at 78, in a manner restricting the dimension of the outer portion of each aperture 65 to a size smaller than the ball diameter, so that the ball cannot move completely out of the aperture. For actuating valve 51 leftwardly to its opened position, I may utilize a setting element, such as a nut 43 threadedly engageable with valve stem 54 and bearing against part 56 to draw the valve to the left in response to rotation of the nut. During the initial portion of this movement, a pull may be exerted on cable 19 to free the balls for entry into part 56. After the valve is set in opened position, nut 43 is completely removed from the valve stem and the valve is then ready for operation.

To now describe the manner of use of the apparatus shown in FIGS. 1 to 3, assume that the apparatus is all assembled in the manner shown in these figures, with connecting assemblies 17 in their illustrated holding conditions, and with valve assemblies 18 in their illustrated open condition. The interconnector 14 then allows free flow of fuel between the two cells 11, without obstruction by the valves. If the aircraft crashes, and does so in a manner tending to displace one of the cells 11 relative to the other cell, and relative to the rest of the aircraft, the crash forces will flex the wall of one of the cells in a manner causing release of the associated connecting assembly 17. More particularly, assume that the portion of the cell wall which is flexed is the upper portion of cell 11 as seen in FIG. 2, which is shifted to the left far enough to displace the illustrated leaf spring 23 past its center position and to the broken line released position of that figure. As discussed previously, this releases all of the latch elements 22 of that connecting mechanism 17 for radially outward releasing movement, under the influence of their individual springs 40, so that ring 21 is freed for complete detachment from ring 20. This detachment of ring 21 is effected without the necessity for actual breakage of any connecting part, but instead is effected by automatically releasing the holding mechanism by virtue of movement of the flexible cell wall.

After the ring 21 and cell have thus been freed for separating movement from ring 20, the crash induced forces will commence to shift the freed cell away from the other cell, so that cable 19 extending between the two cells will automatically pull the two plungers 64 of valve assemblies 18 in the two cells inwardly toward one another. This inward movement of plungers 64 moves the grooves 68 of these plungers to locations opposite balls 63, to thus release the balls from within groove 66, and allow the two valves 51 to move to their closed positions under the influence of springs 62. The cable 19 may be short enough to effect this actuation of the valves in response to very small movement of the cells relatively apart, so that the two valves 51 are closed almost simultaneously with the disconnection of either of the connecting assemblies 17. Thus, the crash forces first break the connection at one of the assemblies 17, and then almost simultaneously with this release function to close both of the valves 51, to prevent the escape of fuel from the interior of either of the cells. Further, cable 19 is formed of a material which is capable of breaking when the tensile forces exerted thereon reach a predetermined value, say a pull of 500 pounds, so that the cable will itself break, after actuating the valves, to prevent the cable from interfering with free movement of one cell relative to the other. The cable is so designed that it will break under the influence of crash forces which are smaller than any forces which would be required to rupture either of the cells 11.

FIGS. 4 and 5 show a slightly variational form of the invention, which is identical with that of FIGS. 1 to 3 except as to the construction of the leaf springs 23a, and the associated screws 50a for limiting movement of leaf springs 23a. More particularly, each of the screws 50a in FIGS. 4 and 5 has an enlargement 79 adjacent ring 21a, and has another enlargement or head 80 spaced outwardly from enlargement 79, and connected thereto by a reduced diameter portion 81. This portion 81 of part 50a extends through a slot 82 in spring 23a, with enlargements 79 and 80 being engageable with spring 23a to limit its rightward and leftward deflection respectively, in the active and released positions respectively of the spring. For passing head 80 through slot 82 during assembly of the apparatus, the slot may have an upper enlarged diameter portion 83. The provision of the stop element 50a in FIGS. 4 and 5 serves to assist in holding the springs 23a and carrier part 24a in proper positions relative to the other portions of the apparatus when the dogs 22a are in both their holding and released positions.

FIG. 6 shows a somewhat variational form of connection constructed in accordance with the invention, and which may be considered to be identical with that of FIGS. 1 to 3 except that the part 14b is a vent line, or some other type of line connected to only one cell 11b, rather than being an interconnector such as that shown at 14 in FIG. 1 and extending between two cells. In this case, there is provided a connecting assembly 17b corresponding to assembly 17 of FIG. 1, and attaching the cell to tube 14b and structural part 15b. Also, there is provided in FIG. 6 a valve assembly 18b which may be identical with one of the valve assemblies 18 in FIGS. 1 to 3, but whose actuating cable 19b is attached at its opposite end to some stationary part, such as a rigid spider or a web 84 attached to part 14b. As will be understood, valve assembly 18b is normally in its open condition, allowing free communication between the interior of cell 11b and the vent line or other line 14b. However, in the event of a crash of the aircraft, deflection of the wall of cell 11b will function to release connecting assembly 17b, free the cell from parts 14b and 15b, following which the pull exerted by cable 19b on the plunger of valve assembly 18b will automatically close the valve assembly to prevent leakage of any fuel from the tank past the valve.

I claim:

1. In an aircraft, the combination comprising a crash resistant fluid containing cell mounted in the craft and adapted to resist rupture if torn from its normal position relative to an adjacent portion of the craft by a crash, and a fluid conducting assembly detachably connecting said cell to said adjacent portion of the aircraft, said assembly including a first fitting attached to said cell, a second fitting attached to said adjacent portion of the aircraft, said two fittings forming together a fluid passage communicating with the interior of the cell through an opening in a wall of said cell, and automatically releasable latch means securing said first fitting to said second fitting in fluid conducting relation, said latch means including automatic release means operable to release the latch means in response to movement of said cell relative to said adjacent portion of the aircraft, said first and second fittings being free for separation from one another when said latch means are released, said latch means including a plurality of latch elements retaining said two fittings together at different locations thereabout, said release means including a carrier part forming generally a loop and having a plurality of fingers engageable with said latch elements respectively and holding them against releasing movement, said carrier part being positioned near said wall of the cell at a location to be deflected by said wall upon crash induced movement thereof and to a position in which said fingers free the latch elements for releasing movement.

2. In an aircraft, the combination comprising a crash resistant fluid containing cell mounted in the craft and adapted to resist rupture if torn from its normal position relative to an adjacent portion of the craft by a crash, and a fluid conducting assembly detachably connecting said cell to said adjacent portion of the aircraft, said assembly including a first fitting attached to said cell, a second fitting attached to said adjacent portion of the aircraft, said two fitings forming together a fluid passage communicating with the interior of the cell through an opening in a wall of said cell, and automatically releasable latch means securing said first fitting to said second fitting in fluid conducting relation, said latch means including automatic release means operable to release the latch means in response to movement of said cell relative to said adjacent portion of the aircraft, said first and second fittings being free for separation from one another when said latch means are released, said latch means including a plurality of latch elements retaining said two fittings together at different locations thereabout, said release means including a carrier part carrying a plurality of leaf springs forming fingers engageable with said latch elements respectively and holding them against releasing movement, said carrier part being positioned near said wall of the cell at a location to be deflected by said wall upon crash induced movement thereof and to a position in which said fingers free the latch elements for releasing movement.

3. In an aircraft, the combination comprising a crash resistant fluid containing cell mounted in the craft and adapted to resist rupture if torn from its normal position relative to an adjacent portion of the craft by a crash, and a fluid conducting assembly detachably connecting said cell to said adjacent portion of the aircraft, said assembly including a first fitting attached to said cell, a second fitting attached to said adjacent portion of the aircraft, said two fittings forming together a fluid passage communicating with the interior of the cell through an opening in a wall of said cell, and automatically releasable latch means securing said first fitting to said second fitting in fluid conducting relation, said latch means including automatic release means operable to release the latch means in response to movement of said cell relative to said adjacent portion of the aircraft, said first and second fittings being free for separation from one another when said latch means are released, said latch means including a plurality of latch elements retaining said two fittings together at different locations spaced thereabout and movable essentially radially between inner holding positions and outer released positions, said release means including a carrier part forming generally a loop carrying a plurality of radially inwardly projecting leaf springs engaging said latch elements and retaining them in holding positions, said cell having a flexible wall positioned near said carrier part at a location to deflect the carrier part and leaf springs to latch releasing positions upon crash induced flexure of said wall.

4. In an aircraft, the combination as recited in claim 3, in which said latch elements are movably mounted to said first fitting and are spring pressed radially outwardly, said latch elements having radially outer portions containing recesses within which edge portions of said leak springs are received, said leaf springs being deformed in a manner to urge said carrier part toward said cell wall until the carrier part is deflected by the wall far enough to release the latch elements.

5. The combination as recited in claim 4, including stop means connected to said first fitting and limiting movement of said carrier part and leaf springs relative to said first fitting.

6. In an aircraft, the combination comprising a crash resistant fluid containing cell mounted in the craft and adapted to resist rupture if torn from its normal position relative to an adjacent portion of the craft by a crash, said cell having a flexible wall structure, and a fluid conducting assembly detachably connecting said cell to said adjacent portion of the aircraft, said assembly including a first fitting attached to said cell, a second fitting attached to said adjacent portion of the aircraft and releasably connectible to said first fitting, said assembly forming a fluid passage communicating with the interior of the cell through an opening in said wall structure of the cell when said two fittings are connected together, and releasable latch means securing said first fitting to said second fitting in fluid conducting relation, said latch means including automatic release means positioned near said flexible wall structure in the path of flexure thereof and at a location to be actuated and thereby release said latch means upon flexure of the wall structure relative to said first fitting, said first and second fittings being free for separation from one another when said latch means are released.

7. The combination as recited in claim 6, in which said two fittings have annular seating surfaces engageable against one another and one of which carries a deformable seal ring forming a fluid tight seal between the fittings.

8. In an aircraft, the combination comprising a crash resistant fluid containing cell mounted in the craft and adapted to resist rupture if torn from its normal position relative to an adjacent portion of the craft by a crash, said cell having a flexible wall structure, a fluid conducting assembly detachably connecting said cell to said adjacent portion of the aircraft, said assembly including a first fitting attached to said cell, a second fitting attached to said adjacent portion of the aircraft, and releasably connectible to said first fitting, said assembly forming a fluid passage communicating with the interior of the cell through an opening in said wall structure of the cell when said two fittings are connected together, and releasable latch means securing said first fitting to said second fitting in fluid conducting relation, said latch means including automatic release means positioned near said flexible wall structure in the path of flexure thereof and at a location to be actuated and thereby release said latch means upon flexure of the wall structure relative to said first fitting, said first and second fittings being free for separation from one another when said latch means are released, and valve means operable to automatically close off communication with the cell through said first fitting when the cell is displaced from said normal position in the aircraft.

9. In an aircraft, the combination comprising a crash resistant fluid containing cell mounted in the craft and adapted to resist rupture if torn from its normal position relative to an adjacent portion of the craft by a crash, said cell having a flexible wall structure, a fluid conducting assembly detachably connecting said cell to said adjacent portion of the aircraft, said assembly including a first fitting attached to said cell, a second fitting attached to said adjacent portion of the aircraft and releasable connectible to said first fitting, said assembly forming a fluid passage communicating with the interior of the cell through an opening in said wall structure of the cell when said two fittings are connected together, and releasable latch means securing said first fitting to said second fitting in fluid conducting relation, said latch means including a plurality of latch elements releasably retaining said two fittings together at different locations thereabout, and a releasing structure movable between active and retracted positions and having portions adapted to engage said different latch elements in said active position and to hold them against releasing movement, said releasing structure being positioned near said flexible wall structure in the path of flexure thereof at a location to be deflected to said retracted position by crash induced flexure of said wall structure to thereby release said latch elements, said first and second fittings being free for separation from one another when said latch means are released.

10. In an aircraft, the combination comprising a crash resistance fluid containing cell mounted in the craft and adapted to resist rupture if torn from its normal position relative to an adjacent portion of the craft by a crash, said cell having a flexible wall structure, a fluid conducting assembly detachably connecting said cell to said adjacent portion of the aircraft, said assembly including a first fitting attached to said cell, a second fitting attached to said adjacent portion of the aircraft and releasably connectible to said first fitting, said assembly forming a fluid passage communicating with the interior of the cell through an opening in said wall structure of the cell when said two fittings are connected together, and releasable latch means securing said first fitting to said second fitting in fluid conducting relation, said latch means including a plurality of latch elements releasably retaining said two fittings together at different locations thereabout, and a releasing structure movable between active and retracted position and having portions adapted to engage said different latch elements in said active position and to hold them against releasing movement, said releasing structure being positioned near said flexible wall structure in the path of flexure thereof at a location to be deflected to said retracted position by crash induced flexure of said wall structure to thereby release said latch elements, said first and second fittings being free for separation from one another when said latch means are released, and valve means carried by said first fitting at a location within said cell and operable to automatically close off communication with the cell through said first fitting when the cell is displaced from said normal position in the aircraft.

11. For use in an aircraft containing a crash resistant fluid containing cell mounted in the craft and having a flexible wall structure and adapted to resist rupture if torn from its normal position relative to an adjacent portion of the craft by a crash; the improvement comprising a fluid conducting assembly for detachably connecting said cell to said adjacent portion of the aircraft, said assembly including a first fitting to be attached to said cell, a second fitting to be attached to said adjacent portion of the aircraft and releasably connectible to said first fitting, said assembly forming a fluid passage adapted to communicate with the interior of the cell through the opening in said wall structure of the cell when said two fittings are connected together, and releasable latch means securing said first fitting to said second fitting in fluid conducting relation, said latch means including a plurality of latch elements retaining said two fittings together at different locations spaced thereabout and movable essentially radially between inner holding positions and outer released positions, and an automatic release structure including a carrier part forming generally a loop carrying a plurality of radially inwardly projecting leaf springs engaging said latch elements and retaining them in holding positions, said carrier part being adapted to be positioned near said wall structure in the path of flexure thereof at a location to be deflected and thereby move said leaf springs to latch releasing positions upon crash induced flexure of said wall, said first and second fittings being free for separation from one another when said latch elements are released.

12. In an aircraft, the combination as recited in claim 11, in which said latch elements are movably mounted to said first fitting and are spring pressed radially outwardly, said latch elements having radially outer portions containing recesses within which edge portions of said leaf springs are received, said leaf springs being deformed in a manner to urge said carrier part toward said cell wall structure until the carrier part is deflected by the wall strucure far enough to release the latch elements.

13. For use in an aircraft containing a crash resistant fluid containing cell mounted in the craft and having a flexible wall structure and adapted to resist rupture if torn from its normal position relative to an adjacent portion of the craft by a crash; the improvement comprising a fluid conducting assembly for detachably connecting said cell to said adjacent portion of the aircraft, said assembly including a first fitting to be attached to said cell, a second fitting to be attached to said adjacent portion of the aircraft and releasably connectible to said first fitting, said assembly forming a fluid passage adapted to communicate with the interior of the cell through an opening in said wall structure of the cell when said two fittings are connected together, and releasable latch means securing said first fitting to said second fitting in fluid conducting relation, said latch means including a plurality of latch elements retaining said two fittings togther at different locations thereabout and movable between active and released positions, and an automatic release structure including a carrier part forming generally a loop and having a plurality of fingers engageable with said latch elements respectively and holding them against releasing movement, said carrier part being adapted to be positioned near said wall structure in the path of flexure thereof at a location to be deflected by said wall structure upon crash induced movement thereof and to a position in which said fingers free the latch elements for releasing movement, said first and second fittings being free for separation from one another when said latch elements are released.

14. For use in an aircraft containing a crash resistant fluid containing cell mounted in the craft and having a flexible wall structure and adapted to resist rupture if torn from its normal position relative to an adjacent portion of the craft by a crash; the improvement comprising a fluid conducting assembly for detachably connecting said cell to said adjacent portion of the aircraft, said assembly including a first fitting to be attached to said cell, a second fitting to be attached to said adjacent portion of the aircraft and releasably connectible to said first fitting, said assembly forming a fluid passage adapted to communicate with the interior of the cell through an opening in said wall structure of the cell when said two fittings are connected together, and releasable latch means securing said first fitting to said second fitting in fluid conducting relation, said latch means including a plurality of latch elements retaining said two fittings together at different locations thereabout and movable between active and released positions, and an automatic release structure including a carrier part forming generally a loop and having a plurality of fingers engageable with said latch elements respectively and holding them against releasing movement, said carrier part being adapted to be positioned near said wall structure in the path of flexure thereof at a location to be deflected by said wall structure upon crash induced movement thereof and to a position in which said fingers free the latch elements for releasing movement, said first and second fittings being free for separation from one another when said latch elements are released, and valve means operable to automatically close off communication with the cell through said first fitting when the cell is displaced from said normal position in the aircraft.

References Cited in the file of this patent

UNITED STATES PATENTS

| | | |
|---|---|---|
| 1,428,933 | Bean | Sept. 12, 1922 |
| 2,048,387 | Johnson | July 21, 1936 |
| 2,666,656 | Brunning | Jan. 19, 1954 |
| 2,805,089 | Hansen | Sept. 3, 1957 |
| 2,816,725 | Swanson | Dec. 17, 1957 |
| 2,916,787 | Samiran | Dec. 15, 1959 |

FOREIGN PATENTS

| | | |
|---|---|---|
| 209,821 | Great Britain | Jan. 17, 1924 |